(12) United States Patent
Lopez-Julia et al.

(10) Patent No.: US 11,268,676 B2
(45) Date of Patent: Mar. 8, 2022

(54) LIGHT-EMITTING DEVICE ASSEMBLY WITH LIGHT REDIRECTION OR INCIDENCE-ANGLE-DEPENDENT TRANSMISSION THROUGH AN ESCAPE SURFACE

(71) Applicant: LUMILEDS LLC, San Jose, CA (US)

(72) Inventors: Antonio Lopez-Julia, Aachen (DE); Venkata Ananth Tamma, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 17/119,528

(22) Filed: Dec. 11, 2020

(65) Prior Publication Data

US 2021/0285625 A1 Sep. 16, 2021

Related U.S. Application Data

(60) Provisional application No. 62/948,705, filed on Dec. 16, 2019.

(51) Int. Cl.
*F21V 9/40* (2018.01)
*G02B 1/00* (2006.01)
(Continued)

(52) U.S. Cl.
CPC .............. *F21V 9/40* (2018.02); *F21V 7/04* (2013.01); *G02B 1/005* (2013.01); *F21Y 2115/10* (2016.08)

(58) Field of Classification Search
CPC ... F21V 9/40; F21V 7/04; G02B 1/005; F21Y 2115/10
See application file for complete search history.

(56) References Cited

U.S. PATENT DOCUMENTS

| 2008/0123339 A1* | 5/2008 | Bierhuizen | F21K 9/60 362/293 |
| 2012/0327655 A1* | 12/2012 | Li | G02B 19/0028 362/235 |

(Continued)

FOREIGN PATENT DOCUMENTS

| JP | 2019176105 A | 10/2019 |
| JP | 2019176106 A | 10/2019 |

OTHER PUBLICATIONS

Li et al, "All-Dielectric Antenna Wavelength Router with Bidirectional Scattering of Visible Light," Nano Letters, 16 4396 (2016).
(Continued)

*Primary Examiner* — Evan P Dzierzynski

(57) ABSTRACT

A light-emitting device assembly includes a concave optical collector, a light-emitting device, and a light-escape surface. The collector redirects incident light by reflection, scattering, or reradiation. The light-emitting device emits device output light to propagate within the optical collector. The light-escape surface extends across an open end of the collector and exhibits (i) incidence-angle-dependent transmission of light that decreases with increasing incidence angle, or (ii) transmissive redirection of light to propagate at an angle less than a corresponding refracted angle, that are imparted by an array of nano-antennae, a partial photonic bandgap structure, a photonic crystal, an array of meta-atoms or meta-molecules, or a multi-layer dielectric thin film. Assembly output light transmitted by the light-escape surface includes first and second portions of the device output light that propagate within the collector without and with redirection, respectively, within the collector by the light-escape surface.

20 Claims, 4 Drawing Sheets

(51) Int. Cl.
  *F21V 7/04*    (2006.01)
  *F21Y 115/10*  (2016.01)

(56) References Cited

U.S. PATENT DOCUMENTS

2017/0045201 A1* 2/2017 Jones .................. F21V 7/30
2018/0000016 A1* 1/2018 Amiya ................ H01L 33/504
2019/0113727 A1   4/2019 Tamma
2020/0200955 A1   6/2020 Lopez-Julia et al.

OTHER PUBLICATIONS

Shibanuma et al, "Experimental Demonstration of Tunable Directional Scattering of Visible Light from All-Dielectric Asymmetric Dimers," ACS Photonics, 4 489 (2017).
The partial European Search Report corresponding to EP application No. 20160405.5, dated Aug. 28, 2020, 16 pages.
The European Search Report corresponding to EP application No. 20160405.5, dated Dec. 3, 2020, 14 pages.

* cited by examiner

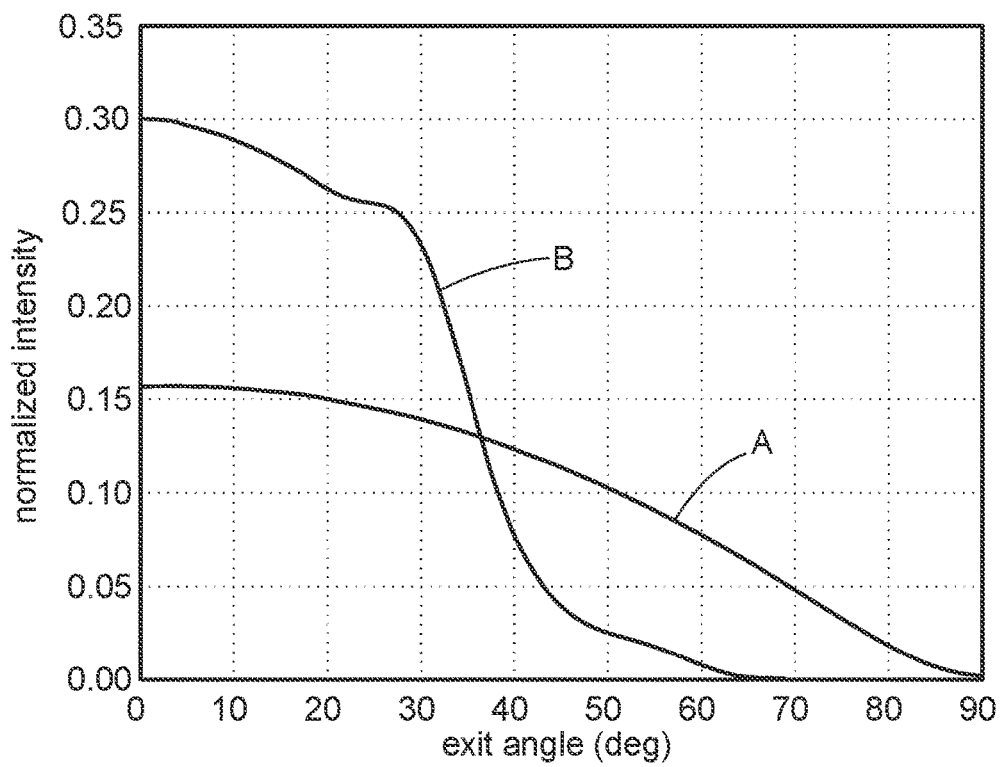
FIG. 3
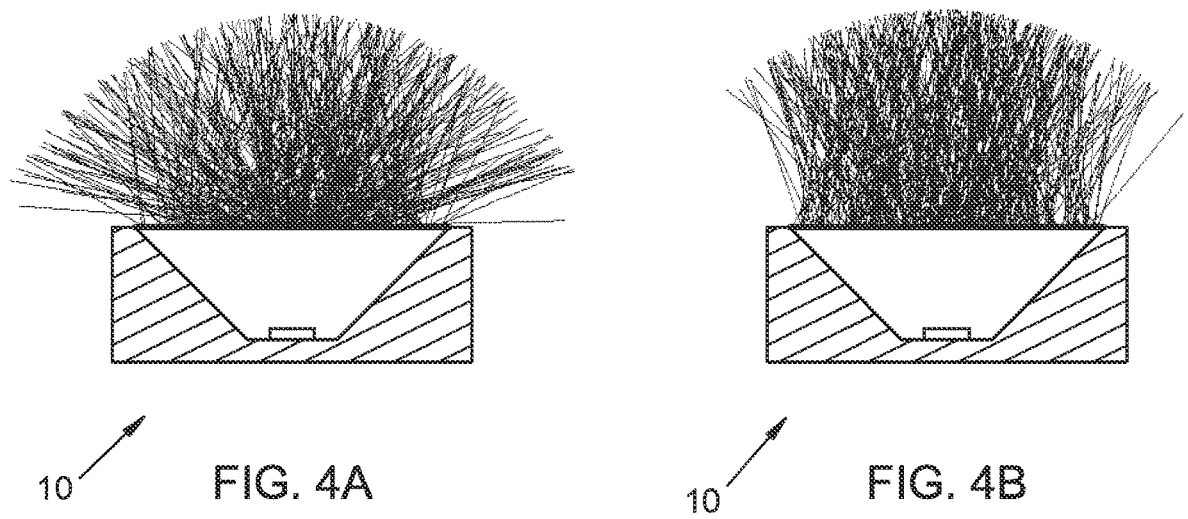
FIG. 4A
FIG. 4B

LIGHT-EMITTING DEVICE ASSEMBLY WITH LIGHT REDIRECTION OR INCIDENCE-ANGLE-DEPENDENT TRANSMISSION THROUGH AN ESCAPE SURFACE

BENEFIT CLAIMS TO RELATED APPLICATIONS

This application claims benefit of U.S. provisional App. No. 62/948,705 entitled "Light-emitting device assembly with light redirection or incidence-angle-dependent transmission through an escape surface" filed Dec. 16, 2019 in the names of Antonio Lopez-Julia and Venkata Ananth Tamma, said provisional application being hereby incorporated by reference as if set forth herein in its entirety.

FIELD OF THE INVENTION

The field of the present invention relates to light-emitting device assemblies. Assemblies are disclosed herein that include light redirection or incidence-angle-dependent optical transmission through an escape surface, resulting in a narrowed angular distribution of optical output power.

BACKGROUND

Typical light-emitting diodes emit radiation as an output beam with an angular intensity distribution that is roughly Lambertian (i.e., having intensity that varies as $\cos\theta$, where $\theta=0°$ defines the primary beam propagation direction, which in many examples is normal to the surface of the emitter). For many practical applications such an intensity distribution is too wide, with an unacceptably high fraction of the total optical output power propagating at angles too far from the primary beam direction to be useful. For example, for a Lambertian distribution only 50% of the total optical output power propagates within a cone defined by $\theta=45°$, which subtends a solid angle of about 1.84 steradians (sr). Some conventional light-emitting device assemblies (sometimes referred to as "light-emitting packages" or "packaged optical sources" or "packaged light-emitting devices") include a concave optical collector with a reflective or scattering inner surface. The collector, in some common examples having a frusto-conical shape, redirects some peripheral portions of the device optical output beam to propagate closer to the primary beam direction, but the effectiveness of such collectors for reshaping the output beam is limited. Secondary optical elements (e.g., domes, lenses, and so forth) can be employed to reshape the angular intensity distribution to increase its directionality (i.e., shift some fraction of the output intensity to smaller angles $\theta$), but such secondary optical elements are often bulky or lossy.

SUMMARY

An inventive light-emitting device assembly includes a concave optical collector, a light-emitting device, and a light-escape surface. The optical collector has an inner surface that redirects within the optical collector light incident on the inner surface within the optical collector. The light-emitting device is positioned and arranged to emit device output light (at a nominal vacuum wavelength $\lambda_0$) to propagate within the optical collector. The light-escape surface extends across an open end of the optical collector and exhibits, at the nominal output vacuum wavelength $\lambda_0$, one or both of (i) incidence-angle-dependent transmission of light that decreases with increasing incidence angle or (ii) transmissive redirection of light to propagate at an angle less than a corresponding refracted angle. One or both of the incidence-angle-dependent transmission or the transmissive redirection are imparted onto the light-escape surface by one or more of (i) an array of nano-antennae, (ii) a partial photonic bandgap structure, (iii) a photonic crystal, (iv) an array of meta-atoms or meta-molecules, or (v) a multi-layer dielectric thin film. The one or both of the incidence-angle-dependent transmission or the transmissive redirection, and the arrangement of the light-emitting device, the optical collector, and the light-escape surface, result in transmission by the light-escape surface, as assembly output light, of first and second portions of the device output light propagating within the optical collector. The first portion propagates within the optical collector from the light-emitting device without redirection within the optical collector by the light-escape surface, with or without one or more redirections by the inner surface of the optical collector. The second portion is redirected within the optical collector at least once by the light-escape surface and eventually transmitted by the light-escape surface after one or more subsequent redirections within the optical collector by the inner surface of the optical collector.

In some instances, at least half of optical power of the assembly output light propagates away from the light-escape surface within a solid angle less than about 1.5 sr (e.g., within a cone defined by $\theta\approx40°$), less than about 1.2 sr (e.g., within a cone defined by $\theta\approx36°$), less than about 1.0 sr (e.g., within a cone defined by $\theta\approx33°$), less than about 0.8 sr (e.g., within a cone defined by $\theta\approx29°$), or less than about 0.5 sr (e.g., within a cone defined by $\theta\approx23°$), less than about 0.20 sr (e.g., within a cone defined by $\theta\approx14.5°$), less than about 0.10 sr (e.g., within a cone defined by $\theta\approx10°$), or even smaller. In some instances more than about 55.%, more than about 60.%, more than about 65.%, more than 70.%, more than about 75.%, more than about 80.%, or even higher, of optical power of the assembly output light propagates away from the light-escape surface of within a solid angle that is less than about 1.8 sr (e.g., within a cone defined by $\theta=45°$).

Objects and advantages pertaining to light-emitting device assemblies may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 illustrates calculated angular intensity distributions for a conventional light-emitting device assembly (curve A) and for an example of an inventive light-emitting device assembly (curve B).

FIGS. 4A and 4B illustrate schematically simulated angular intensity distributions for, respectively, a conventional light-emitting device assembly and an example of an inventive light-emitting device assembly.

The embodiments depicted are shown only schematically; all features may not be shown in full detail or in proper proportion; for clarity certain features or structures may be exaggerated or diminished relative to others or omitted entirely; the drawings should not be regarded as being to scale unless explicitly indicated as being to scale. In particular, the height, depth, or width of various elements often can be exaggerated relative to other elements or, e.g., the thickness of an underlying substrate. The embodiments shown are only examples and should not be construed as limiting the scope of the present disclosure or appended claims.

DETAILED DESCRIPTION OF EMBODIMENTS

It would be desirable to provide an inventive light-emitting device assembly that provides a more directional output beam (i.e., a narrower angular intensity distribution) by redirecting portions of the device output light that propagate at larger angles θ to instead propagate at smaller angles θ, but without employing secondary optical elements, without increasing the size of the assembly, or without altering the form factor of the assembly. Note that for purposes of the present disclosure the terms "beam" or "optical beam" refer to light propagating with a particular angular intensity distribution; use of the term "beam" is not intended to imply that the light propagates in any particular one or more optical modes. A beam can be considered to be "narrowed" or "made more directional" if its altered angular intensity distribution results in one or both of (i) a larger fraction of the total optical power propagating within a given solid angle (e.g., fraction of optical power within a cone defined by θ=45° increases from 50% to 70%) or (ii) a given fraction of the total optical power propagating within a smaller solid angle (e.g., the cone within which propagates 50% of optical power decreases from θ=45° to θ=30°). For purposes of the present disclosure and appended claims, "incidence angle" and "angle of incidence" of light incident on a surface or interface refer to the angle between the propagation direction of the incident light and a vector normal to the surface or interface. Accordingly, light propagating at normal incidence with respect to a surface would have an incidence angle of 0°, while light propagating near grazing incidence with respect to that surface would have an incidence angle approaching 90°. The corresponding refracted angle is determined by the incidence angle and Snell's Law for a given interface or surface.

Figure 1:
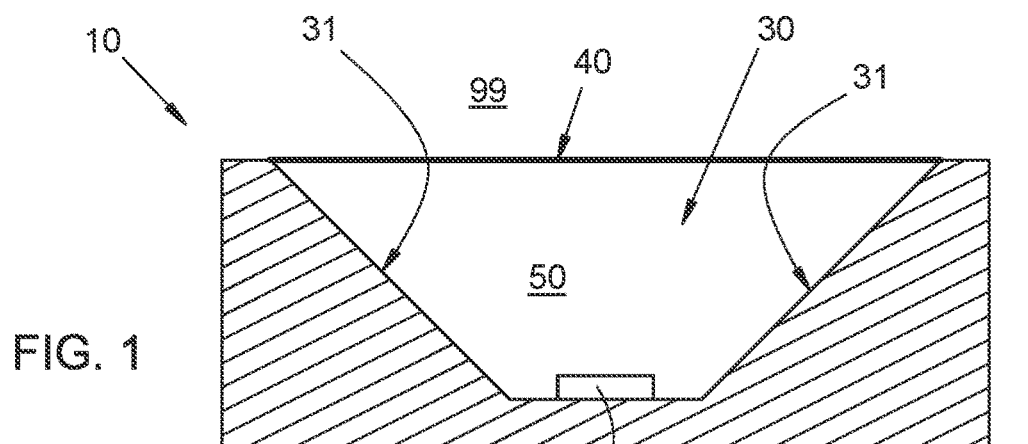
FIG. 1 is a schematic side cross-sectional view of an example of an inventive light-emitting device assembly.
Figure 5A:
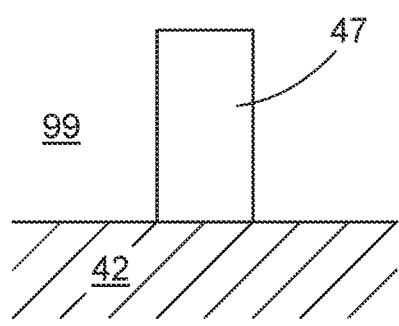
FIGS. 5A through 5D illustrate schematically several examples of nano-antennas.
Figure 5B:
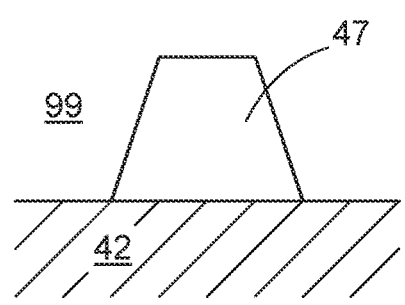
Figure 5C:
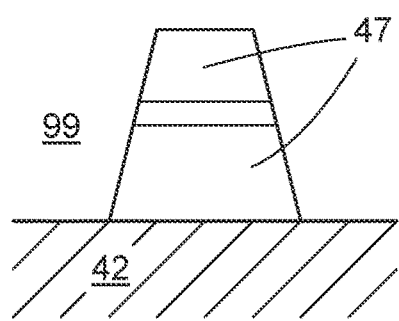
Figure 5D:
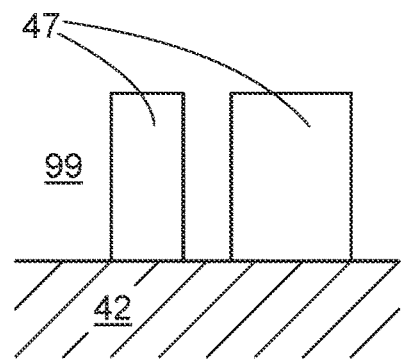

An inventive light-emitting device assembly 10 is illustrated schematically in FIG. 1 and comprises a light-emitting device 20, a concave optical collector 30, and a light-escape surface 40. The inner surface 31 of the optical collector 30 redirects any incident light within the optical collector 30 to propagate within the optical collector 30. The light-emitting device 20 is positioned and arranged to emit device output light (i.e., the optical output of the light-emitting device 20; at a nominal output vacuum wavelength $\lambda_0$) to propagate within the optical collector 30. The light-escape surface 40 extends across an open end of the optical collector 30. The light-escape surface 40 exhibits (at the nominal output vacuum wavelength $\lambda_0$) one or both of (i) incidence-angle-dependent transmission that decreases with increasing incidence angle or (ii) transmissive redirection of light at an angle less than the corresponding refractive angle. Many different structural arrangements of the light-escape surface 40 can be employed to achieve the desired incidence-angle-dependent transmission or transmissive redirection; some specific examples of those are discussed further below. The assembly output light (i.e., the optical output of the inventive light-emitting device assembly 10) propagates in an ambient medium 99 and includes first and second portions of the device output light propagating within the optical collector 30 and transmitted by the light-escape surface 40. The first portion is transmitted by the light-escape surface 40 after propagating within the optical collector 30 from the light-emitting device 20 without redirection within the optical collector 30 by the light-escape surface 40, with or without one or more intervening redirections by the inner surface 31 of the optical collector 30. The second portion is redirected within the optical collector 30 at least once by the light-escape surface 40 and eventually transmitted by the light-escape surface 40 after one or more subsequent redirections within the optical collector 30 by the inner surface 31.

Figure 2A:
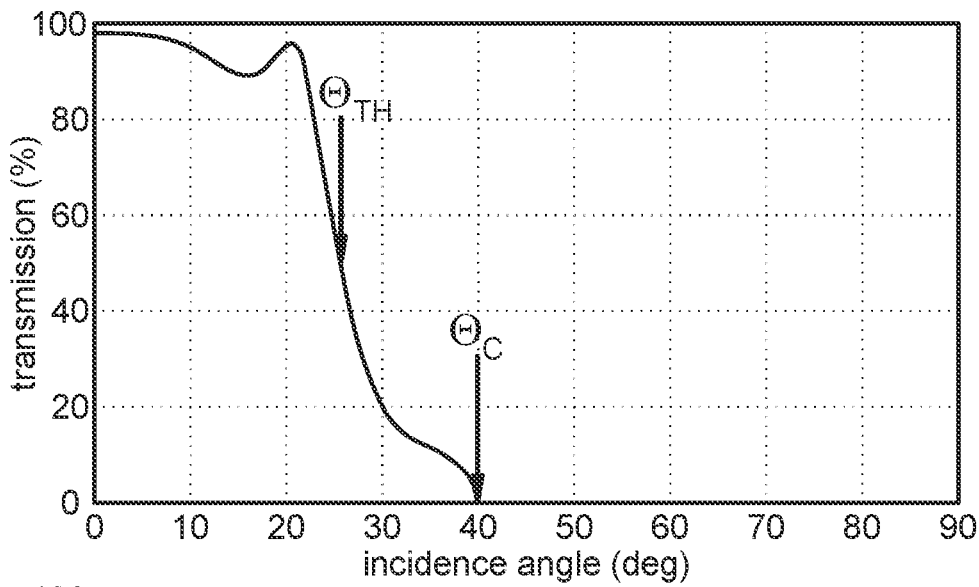
FIGS. 2A through 2C are examples of transmission spectra for a light-escape surface of an inventive light-emitting device assembly.
Figure 2B:
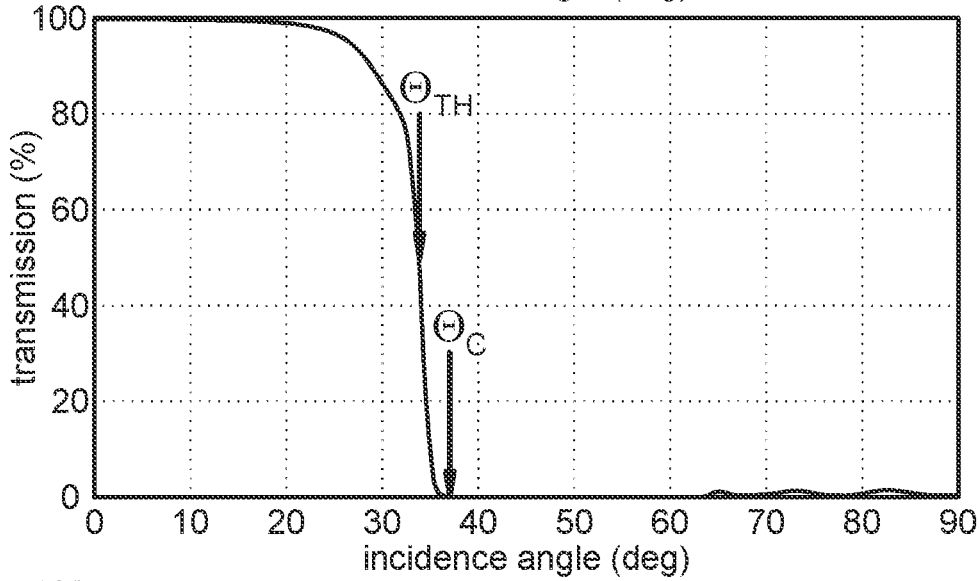
Figure 2C:
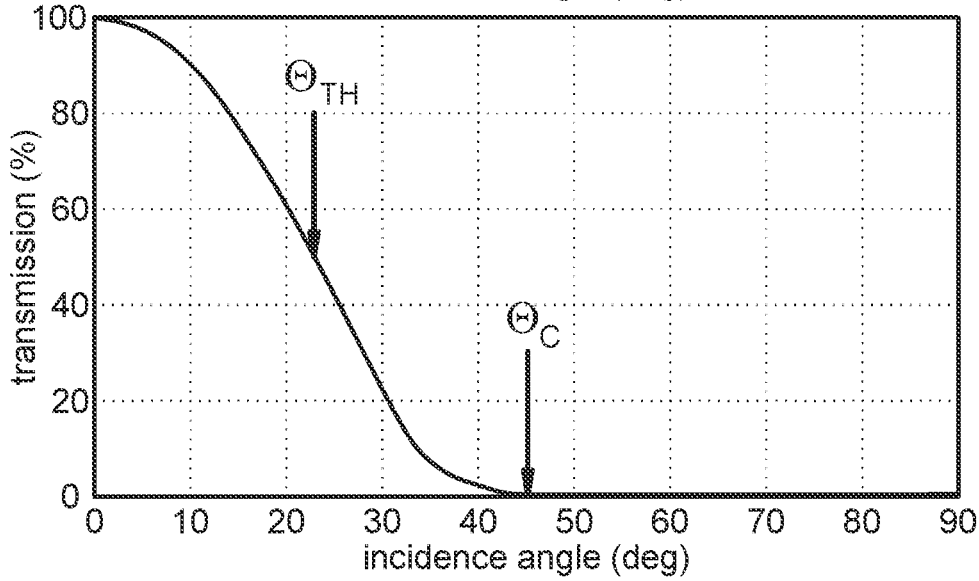

Whatever the structural arrangement employed for the light-escape surface 40, in some examples the incidence-angle-dependent transmission can be characterized by a half-transmission angle $\Theta_{TH}$ (i.e., the incidence angle at which transmission through the light-escape surface 40 drops to about 50%). Instead, or in addition, in some examples the incidence-angle-dependent transmission can be characterized by a cut-off angle $\Theta_C$ (i.e., the incidence angle above which there is no transmission, or only negligible transmission, through the light-escape surface 40). Some examples of suitable incidence-angle-dependent transmission, with the angles $\Theta_{TH}$ and $\Theta_C$ labelled, are shown in FIGS. 2A-2C. In some examples, the incidence-angle-dependent transmission of the light-escape surface 40 is characterized by a half-transmission angle $\Theta_{TH}$ that is less than about 60. degrees, less than about 45. degrees, less than about 30. degrees, less than about 15. degrees, or even smaller.

Figure 6:
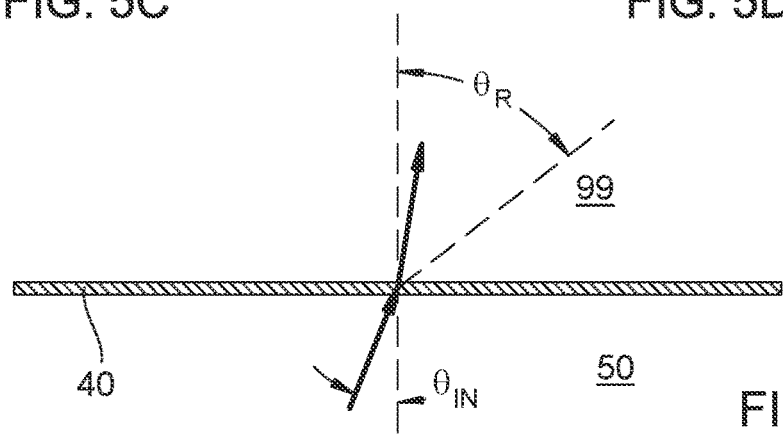
FIG. 6 illustrates schematically transmissive redirection of light to propagate at an angle less than the corresponding refracted angle.

Instead of, or in addition to, the incidence-angle-dependent transmission, the light-escape surface 40 can be structurally arranged so as to exhibit transmissive redirection of an optical signal incident within the collector 50 at an incidence angle $\theta_{IN}$ to propagate in the ambient medium 99 at an angle that is less than the corresponding refracted angle $\theta_R$ (e.g., as illustrated schematically in FIG. 6). The term "transmissive redirection" is intended to encompass transmission of an optical signal to propagate at an angle the does not corresponding to normal refraction, but instead at an angle less than that of normal refraction. In some examples, at least a portion of light incident within the medium 50, at an incidence angle that exceeds the critical angle, can be transmissively redirected, instead of totally internally reflected, to propagate in the ambient medium 99. Generally, the angular intensity distribution of the optical output of the inventive light-emitting device assembly 10 (i.e., the beam shape of the assembly output light) depends in a complex way on (i) the angular intensity distribution of optical output of the light-emitting device 20 (i.e., the beam shape of the device output light), (ii) the shape and redirection efficiency of the inner surface 31 of the optical collector 30, and (iii) one or both of the incidence-angle-dependent transmission or the transmissive redirection of the light-escape surface 40. With those inputs, calculations or computer simulations can be employed to obtain estimates of the assembly output light beam shape. Generally, for a given light-emitting device 20 and optical collector 30, decreasing the half-transmission angle $\Theta_{TH}$ or cut-off angle $\Theta_C$ of the light-escape surface 40, or shifting the transmissive redirection closer to normal to the escape surface 40, results in increasing directionality of the assembly output light.

In some examples, one or both of the incidence-angle-dependent transmission or the transmissive redirection of the light-escape surface 40, and arrangement of the light-emitting device 20, the optical collector 30, and the light-escape surface 40, result in propagation away from the light-escape surface 40 of at least half of optical power of the assembly output light within a solid angle less than about 1.5 sr (e.g., within a cone defined by $\theta=40°$), less than about 1.2 sr (e.g., within a cone defined by $\theta=36°$), less than about 1.0 sr (e.g., within a cone defined by $\theta=33°$), less than about 0.8 sr (e.g., within a cone defined by $\theta=29°$), less than about 0.5 sr (e.g., within a cone defined by $\theta=23°$), less than about 0.20 sr (e.g., within a cone defined by $\theta=14.5°$), less than about 0.10 sr (e.g., within a cone defined by $\theta=10°$), or even smaller. Recall that for a Lambertian intensity distribution (e.g., approximated by curve A in FIG. 3), half of the optical power propagates with a solid angle of about 1.84 sr (e.g., within a cone with $\theta=45°$).

In some examples, one or both of the incidence-angle-dependent transmission or the transmissive redirection of the light-escape surface 40, and arrangement of the light-emitting device 20, the optical collector 30, and the light-escape surface 40, result in propagation away from the light-escape surface of more than about 55.%, more than about 60.%, more than about 65.%, more than 70.%, more than about 75.%, more than about 80.%, or even higher, of optical power of the assembly output light within a solid angle that is less than about 1.8 sr (e.g., within a cone defined by $\theta=45°$). The inventive arrangement of the light-emitting device assembly 10 typically results in assembly output light that is more directional (i.e., narrower) than the device output light. In some examples, one or both of the incidence-angle-dependent transmission or the transmissive redirection of the light-escape surface 40, and arrangement of the light-emitting device 20, the optical collector 30, and the light-escape surface 40, result in propagation away from the light-escape surface 40 of at least half of optical power of the assembly output light within a solid angle that is less than about 90.%, less than about 75.%, less than about 60.%, less than about 50.%, less than about 35.%, less than about 20.%, or even less, of a solid angle within which propagates away from the light-emitting device 20 at least half of optical power of the device output light.

Curve B of FIG. 3 is a calculated angular intensity distribution of assembly output light emitted from an inventive light-emitting device assembly 10 employing a device output light characterized by the angular intensity distribution of curve A of FIG. 3 combined with a light-escape surface 40 that exhibits the incidence-angle-dependent transmission of FIG. 2A. FIGS. 4A and 4B illustrate a comparison of simulations for a conventional light-emitting device assembly 5 (with a simple refractive interface 7 between a fill medium 50 of silicone and an ambient medium 99 of air; FIG. 4A) and an inventive light-emitting device assembly 10 (with the light-escape surface 40 characterized by the transmission spectrum of FIG. 2A; FIG. 4B). For the simulated assembly output light of curve B of FIG. 3, greater than about 80% of the optical output power propagates within a solid angle of about 1.84 sr (e.g., within a cone defined by $\theta=45°$).

As noted above, there are many ways in which the light-escape surface 40 can be structurally arranged so as to exhibit one or both of the desired incidence-angle-dependent transmission or the desired transmissive redirection. In some examples the light-escape surface can include one or more of (i) an array of nano-antennae, (ii) a partial photonic bandgap structure, (iii) a photonic crystal, (iv) an array of meta-atoms or meta-molecules, or (v) a multi-layer dielectric thin film. In those and other examples, the light-escape surface can include one or more materials among: doped or undoped silicon; one or more doped or undoped III-V, II-VI, or Group IV semiconductors; doped or undoped silicon oxide, nitride, or oxynitride; one or more doped or undoped metal oxides, nitrides, or oxynitrides; one or more optical glasses; one or more doped or undoped polymers; or one or more metals or metal alloys.

In some examples the light-escape surface 40 can be arranged so that at least a portion of transmitted light is refracted according to the corresponding refracted angle determined by respective refractive indices of whatever medium fills the interior volume of the optical collector 30 and an ambient medium 99 in which the assembly output light propagates. In some examples the light-escape surface 40 can be arranged so that at least a portion of transmitted light is redirected to propagate in the ambient medium 99 in one or more directions different from the direction of refraction (including, e.g., the transmissive redirection described above). In some examples the light-escape surface 40 can be arranged so that at least a portion of light redirected within the optical collector 30 by specular reflection. In some examples the light-escape surface 40 is arranged so that at least a portion of redirected light is redirected to propagate within the optical collector 30 in one or more directions different from the direction of specular reflection.

In some examples the light-escape surface 40 can include an array of nano-antennae 47. Several examples are illustrated schematically in FIGS. 5A-5D, in which the nano-antennae are shown extending from a substrate 42 into the ambient medium 99; in other examples (not shown) the nano-antennae 47 can extend from a substrate 42 into the fill medium 50, can extend from the surface of a solid fill medium 50 into the ambient medium 99 or into the fill medium 50, or can be embedded within a substrate 42. The nano-antennae can include one or more antenna materials (e.g., silicon or $TiO_2$), and can be shaped (e.g., cylindrical), sized relative to the nominal output vacuum wavelength $\lambda_0$ (e.g., 56 nm radius and 150 nm height for silicon with $\lambda_0=450$ nm; 56 nm radius and 250 nm height for $TiO_2$ with $\lambda_0=450$ nm), arranged along the light-escape surface 40 (e.g., a hexagonal grid), and spaced relative to the nominal output vacuum wavelength $\lambda_0$, (e.g., 200 nm grid spacing for $\lambda_0=450$ nm) so as to reradiate, upon irradiation by device output light, at least a portion of the device output light so as to result collectively in a desired or specified incidence-angle-dependent transmission or transmissive redirection. Other sizes, materials, antenna shapes (e.g., cylindrical, frusto-conical, horizontal dimers, vertical dimers, coaxial dimers, and so forth; as in, e.g., FIGS. 5A-5D), sizes, spacing, and arrangements (e.g., rectangular grid, hexagonal grid, other grids, or an irregular, aperiodic, or random arrangement) can be employed.

Typically, calculation or computer simulation is required to achieve at least a preliminary design for a nano-antennae array; in some instances, a final design can be achieved by iterative experimental optimization of the various parameters by fabricating and characterizing test arrays. Note that an array that is not necessarily fully optimized can nevertheless provide incidence-angle-dependent transmission adequate to provide an acceptably narrow beam for the assembly output light; such partly optimized arrays fall within the scope of the present disclosure or appended claims. Examples of suitable nano-antennae arrays can be found in, e.g., (i) U.S. non-provisional application Ser. No. 16/230,760 entitled "High brightness directional direct emitter with photonic filter of angular momentum" filed Dec. 21, 2018 in the names of Antonio Lopez-Julia and Ananth Tamma, (ii) Li et al, "All-Dielectric Antenna Wavelength Router with Bidirectional Scattering of Visible Light," *Nano Letters*, 16 4396 (2016), and (iii) (i) Shibanuma et al, "Experimental Demonstration of Tunable Directional Scattering of Visible Light from All-Dielectric Asymmetric Dimers," *ACS Photonics*, 4 489 (2017), each of which is incorporated by reference as if fully set forth herein.

In some examples, the light-escape surface 40 can include a partial photonic bandgap structure arranged with one or more materials, morphology, and spacing relative the nominal output vacuum wavelength $\lambda_0$, so as to redirect, upon irradiation by device output light, at least a portion of the device output light so as to result in a desired or specified incidence-angle-dependent transmission or transmissive redirection. In some examples the light-escape surface 40 can include a photonic crystal arranged with one or more materials, crystal morphology, and crystal-lattice spacing relative the nominal output vacuum wavelength $\lambda_0$, so as to redirect, upon irradiation by device output light, at least a portion of the device output light so as to result in a desired or specified incidence-angle-dependent transmission or transmissive redirection. In some examples the light-escape surface 40 can include an array of meta-atoms or meta-molecules that can include one or more meta-materials, and can be shaped, sized relative to the nominal output vacuum wavelength $\lambda_0$, arranged along the light-escape surface 40, and spaced relative to the nominal output vacuum wavelength $\lambda_0$, so as to reradiate, upon irradiation by device output light, at least a portion of the device output light so as to result collectively in a desired or specified incidence-angle-dependent transmission or transmissive redirection. In any of those examples, calculation or simulation followed by iterative experimental optimization (or at least partial optimization) can be employed, in a manner similar to that described above.

In some examples the light-escape surface 40 can include a multi-layer dielectric thin film that incorporate two or more materials characterized by corresponding refractive indices and having layer thicknesses, relative the nominal output vacuum wavelength $\lambda_0$, so as exhibit a desired or specified incidence-angle-dependent transmission. For example, transmission spectra of conventional thin-film short pass (SP) or bandpass (BP) optical filters are known to shift to shorter wavelengths as the angle of incidence increases; non-transmitted light undergoes specular reflection. A suitable SP or BP filter can be designed to transmit device output light at normal incidence and within a specified angular range about normal incidence, but to reflect device output light outside the specified angular range for which the wavelength-dependent transmission spectrum of the filter has blue-shifted sufficiently. The SP or BP filter typically transitions between transmissive and reflective behaviors over some small angular range; the steepness of that transition depends on the specific filter design, and in some examples can be tailored to some extent to provide desired incidence-angle-dependent transmission. Other suitable arrangements based on multi-layer dielectric thin films can be employed. In some of those examples, the multi-layer thin film can be arranged so as to form an optical resonator among layers of the multi-layer dielectric thin film. Tuning a resonance wavelength of such a resonator, relative the nominal output vacuum wavelength $\lambda_0$, can be employed to at least partly determine the incidence-angle-dependent transmission of the multi-layer thin film.

The optical collector 30 can be arranged in any suitable way and can include any one or more suitable materials. The optical collector 30 can be realized as a concavity formed in a solid member (as shown in the drawings), or can be realized as a thin, concave shell. The inner surface 31 of the optical collector 30 redirects within the optical collector light that is incident on the inner surface 31 within the optical collector 30. The inner surface 31 of the optical collector 30 can include one or more materials among: doped or undoped silicon; one or more doped or undoped III-V, II-VI, of Group IV semiconductors; doped or undoped silicon oxide, nitride, or oxynitride; one or more doped or undoped metal oxides, nitrides, or oxynitrides; one or more optical glasses; one or more doped or undoped polymers; or one or more metals or metal alloys. In some examples the inner surface of the optical collector includes a specular reflector or a diffuse scatterer, such as a metal surface, a metallic coating, or a dielectric coating (e.g., a multi-layer dielectric thin film). In some examples the inner surface 31 of the optical collector 30 can include one or more of (i) an array of nano-antennae, (ii) a partial photonic bandgap structure, (iii) a photonic crystal, or (iv) an array of meta-atoms or meta-molecules. Such structures are described above, although such structures designed for use on the inner surface 31 and the light-escape surface 40 would typically differ from one another given their differing performance requirements. Any suitable open-ended shape can be employed for the inner surface 31 of the optical collector 30. Typically, a shape is employed that tapers from the open end toward the light-emitting device 20. In many examples the inner surface 31 includes an area surrounding the light-emitting device 20 that is at least roughly perpendicular to the primary propagation direction of the device output light. In some examples, at least a portion of the inner surface 31 of the optical collector 30 can be shaped as (i) a frustum of a circular or elliptical cone, (ii) a frustum of a pyramid (of any suitable or desirable number of sides), or (iii) a portion of a sphere, spheroid, ellipsoid, paraboloid, hyperboloid, or ovoid.

The inventive light-emitting device assembly 10 relies on so-called light recycling to avoid unacceptably high loss of device output light. If the only goal is to achieve a narrow intensity distribution without regard for optical output power, then a small aperture placed at a distance from the light emitting device can yield an arbitrarily narrow intensity distribution for the light transmitted through the aperture, at the expense of losing a large fraction, or nearly all, of the device output light. That is not a suitable solution. The light-escape surface 40 limits transmission of device output light to a reduced range of incidence angles, thereby increasing the directionality of the assembly output light relative to the device output light. However, the fraction of device output light at larger incidence angles that is redirected to propagate within the optical collector 30 is redirected one or more times by the inner surface 31 until it again reaches the light-escape surface 40. If incident within the angular range of transmission, the multiply redirected device output light will be transmitted as assembly output light. If not, then the process repeats. The efficiency of redirection of light by the inner surface 31 (e.g., reflectivity of a specular reflector, or scattering efficiency of a diffuse scatterer) must be high to achieve adequate optical power of assembly output light within the desired solid angle. In some examples, efficiency of redirection of incident light by the inner surface 31 of the optical collector 30 is greater than about 95.%, greater than about 97.%, or greater than about 98.%. Increasing redirection efficiency of the inner surface 31 in turn increases the fraction of the device output light the emerges from the inventive light-emitting device assembly 10 as assembly output light within the desired solid angle. In some examples the amount of light propagating within a narrowed solid angle can increase even if overall throughput of optical power from the light-emitting device 20 is reduced. For similar reasons, any medium filling any portion of the interior volume of the optical collector 30 should exhibit low optical absorption at the nominal vacuum wavelength $\lambda_0$. Decreased optical absorption results in an increased fraction of the device output light that emerges as assembly output light within the desired solid angle.

Figure 7:
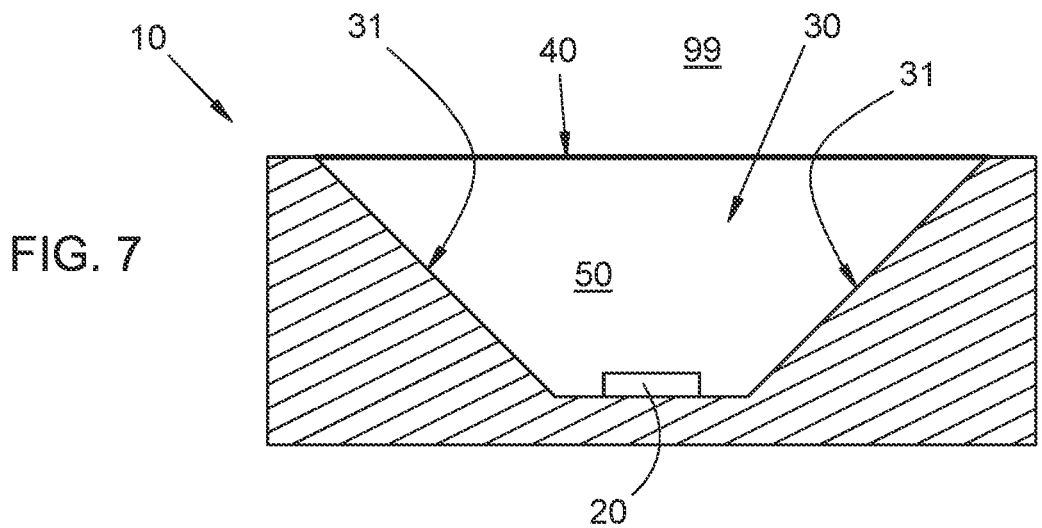
FIG. 7 is a schematic side cross-sectional view of another example of an inventive light-emitting device assembly.
Figure 8:
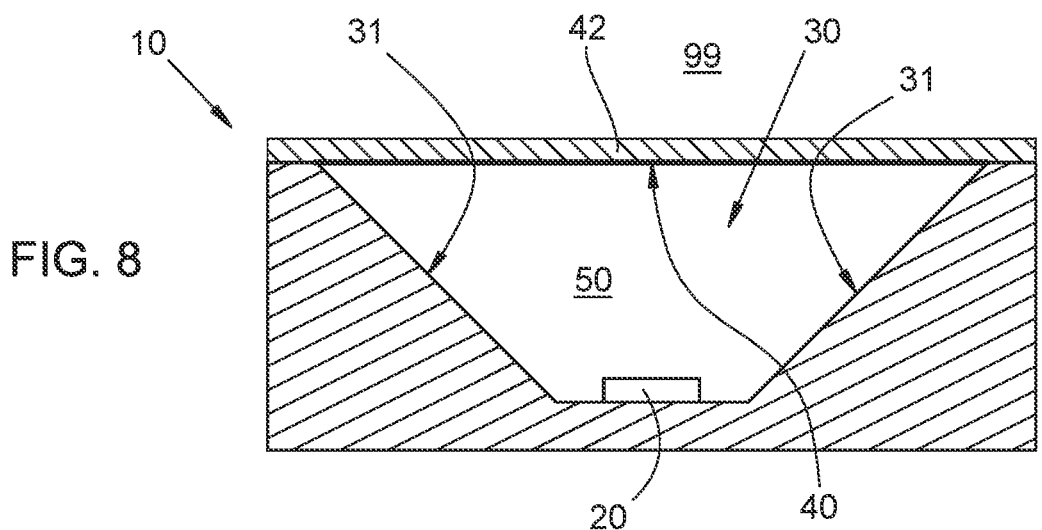
FIG. 8 is a schematic side cross-sectional view of another example of an inventive light-emitting device assembly.

In some examples the fill medium 50 is a substantially solid medium that at least partly fills the interior volume of the optical collector 30; the solid fill medium 50 is substantially transparent at the nominal output vacuum wavelength $\lambda_0$. In some of those examples the light-escape surface 40 can be formed at an interface between the solid fill medium 50 and the ambient medium 99 (e.g., as in FIG. 7). In some examples the solid fill medium 50 includes one or more materials among: doped or undoped silicone, or one or more other doped or undoped polymers. In some other examples the inventive light-emitting device assembly 10 further comprises a substantially solid substrate 42 that separates the interior volume of the optical collector 30 from the ambient medium 99 (e.g., as in FIG. 8); the substrate 42 is substantially transparent at the nominal output vacuum wavelength $\lambda_0$. The light-escape surface 40 is deposited on, attached to, or formed on or within the substrate 42 in any suitable arrangement, including any of those described above. The substrate 42 can include one or more materials among: doped or undoped silicon; one or more doped or undoped III-V, II-VI, or Group IV semiconductors; doped or undoped silicon oxide, nitride, or oxynitride; one or more doped or undoped metal oxides, nitrides, or oxynitrides; one or more optical glasses; or one or more doped or undoped polymers. Sapphire (i.e., crystalline aluminum oxide) is commonly employed. With a substrate 42 present to separate the interior volume of the optical collector 30 from the ambient medium 99, in some examples the fill medium 50 can be the same medium as the ambient medium 99. One common arrangement of this type includes an air-filled interior volume of the optical collector 30; other suitable gaseous or liquid fill media 50 (substantially transparent at the nominal vacuum wavelength $\lambda_0$), or vacuum, can at least partly fill the interior volume. In some examples that include a substrate 42, a substantially solid fill medium 50 (substantially transparent at the nominal vacuum wavelength $\lambda_0$) at least partly fills the interior volume of the optical collector 30. Typically, such a solid fill medium 50 and the substrate 42 are different materials; in some instances, they can be the same material.

Figure 9:
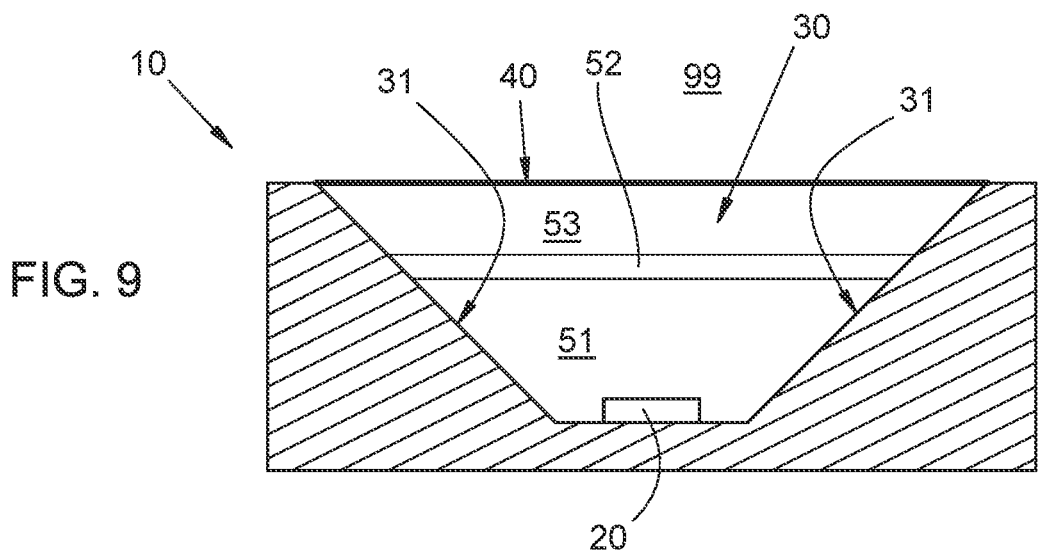
FIG. 9 is a schematic side cross-sectional view of another example of an inventive light-emitting device assembly.

In some examples (e.g., as illustrate schematically in FIG. 9), an intervening layer of a lower-index medium 52 (substantially transparent at the nominal vacuum wavelength $\lambda_0$) is positioned between different portions of a solid fill medium (i.e., an "escape" portion 53 between the intervening layer 52 and the light-escape surface 40 and a "device" portion 51 between the intervening layer 52 and the light-emitting device 20). The lower-index medium 52 is characterized by a refractive index lower than that of the solid fill media 51 and 53, and the medium 53 can have a refractive index larger than or equal to that of the medium 51. In some instances, the medium 53 can also serve as the substrate 42. The intervening layer 52 acts as an angular "pre-filter" by redirecting portions of the device output light by total internal reflection. Only those portions of the device output light that are incident on the intervening layer 52 below the critical angle (for the interface between the solid fill medium 51 and the lower-index medium of the intervening layer 52) are transmitted through the intervening layer 52 into the "escape" portion 53 of the solid fill medium to reach the light-escape surface 40; the remainder is redirected by total internal reflection to propagate in the "device" portion 51 of the solid fill medium before again reaching the intervening layer 52 after one or more redirections by the inner surface 31 of the optical collector 30.

In various examples, the nominal output vacuum wavelength $\lambda_0$, can be larger than about 0.20 µm, larger than about 0.4 µm, or larger than about 0.8 µm; in various examples, the nominal output vacuum wavelength $\lambda_0$ can be smaller than about 10. µm, smaller than about 2.5 µm, or smaller than about 1.0 µm. The light-emitting device 20 can be of any suitable type or arrangement. A common implementation includes a light-emitting diode (LED) as the light-emitting device 20. Whatever the type or arrangement of the light-emitting device 20, in some examples it can include one or more doped or undoped III-V, II-VI, or Group IV semiconductor materials or alloys or mixtures thereof. For purposes of the present disclosure and appended claims, "at a nominal vacuum wavelength $\lambda_0$" means that the wavelength spectrum of the device output light includes a range of wavelengths that includes $\lambda_0$. In many examples the device output light is within about ±5 nm or about ±10 nm of $\lambda_0$; in other examples the spectral width of the device output light can be greater than that.

Methods for making an inventive light-emitting device assembly 10 include assembling the light-emitting device 20 with the concave optical collector 30, and forming the light-escape surface 40. Any suitable one or more fabrication or material processing techniques can be employed for forming the light-escape surface 40 in any suitable arrangement (including all of those described above). Suitable techniques can include, but are not limited to, layer growth, masked or non-masked deposition, masked or non-masked lithography, masked or non-masked wet or dry etching, epitaxy, direct-write, self-assembly, and so forth. Which one or more techniques are suitable, desirable, or necessary depends on the nature of the light-escape surface 40 (e.g., multi-layer thin film, nano-antenna array, or other) and the location and timing of its formation (e.g., on the substrate 42 that is later assembled with the optical collector 30, on the surface of the solid medium 50 that fills the optical collector 30, or other).

A method for operating an inventive light-emitting device assembly 10 includes supplying electrical power to the light-emitting device 20 so that the light-emitting device assembly 10 emits assembly output light from the light-escape surface 40.

In addition to the preceding, the following example embodiments fall within the scope of the present disclosure or appended claims:

Example 1. A light-emitting device assembly comprising: (a) a concave optical collector having an inner surface that redirects within the optical collector light incident on the inner surface within the optical collector; (b) a light-emitting device positioned and arranged so as to emit device output light to propagate within the optical collector, the device output light being characterized by a nominal output vacuum wavelength $\lambda_0$; and (c) a light-escape surface that extends across an open end of the optical collector and includes one or more of (i) an array of nano-antennae, (ii) a partial photonic bandgap structure, (iii) a photonic crystal, (iv) an array of meta-atoms or meta-molecules, or (v) a multi-layer dielectric thin film, the light-escape surface being structurally arranged so as to exhibit, at the nominal output vacuum wavelength $\lambda_0$, one or both of (i) incidence-angle-dependent transmission of light that decreases with increasing incidence angle or (ii) transmissive redirection of light to propagate at an angle less than a corresponding refracted angle, so that the light-escape surface exhibits transmission, as assembly output light, of first and second portions of the device output light propagating within the optical collector, the first portion without redirection within the optical collector by the light-escape surface and the second portion with redirection within the optical collector by the light-escape surface.

Example 2. The apparatus of Example 1 wherein the light-escape surface is structurally arranged so as to exhibit, at the nominal output vacuum wavelength $\lambda_0$, the transmissive redirection of light to propagate at an angle less than a corresponding refracted angle.

Example 3. The apparatus of any one of Examples 1 or 2 wherein the light-escape surface is structurally arranged so as to exhibit, at the nominal output vacuum wavelength $\lambda_0$, the incidence-angle-dependent transmission of light that decreases with increasing incidence angle.

Example 4. The apparatus of Example 3 wherein the incidence-angle-dependent transmission of the light-escape surface is characterized by a half-transmission angle $\Theta_{TH}$ that is less than about 60. degrees, less than about 45. degrees, less than about 30. degrees, less than about 15. degrees, or even smaller.

Example 5. The apparatus of any one of Examples 1 through 4 wherein one or both of the incidence-angle-dependent transmission or the transmissive redirection of the light-escape surface, and arrangement of the light-emitting device, the optical collector, and the light-escape surface, result in propagation away from the light-escape surface of at least half of optical power of the assembly output light within a solid angle less than about 1.5 sr, less than about 1.2 sr, less than about 1.0 sr, less than about 0.8 sr, less than about 0.5 sr, less than about 0.20 sr, less than about 0.10 sr, or even smaller.

Example 6. The apparatus of any one of Examples 1 through 5 wherein one or both of the incidence-angle-dependent transmission or the transmissive redirection of the light-escape surface, and arrangement of the light-emitting device, the optical collector, and the light-escape surface, result in propagation away from the light-escape surface of more than about 55.%, more than about 60.%, more than about 65.%, more than 70.%, more than about 75.%, more than about 80.%, or even higher, of optical power of the assembly output light within a solid angle that is less than about 1.8 sr.

Example 7. The apparatus of any one of Examples 1 through 6 wherein one or both of the incidence-angle-dependent transmission or the transmissive redirection of the light-escape surface, and arrangement of the light-emitting device, the optical collector, and the light-escape surface, result in propagation away from the light-escape surface of at least half of optical power of the assembly output light within a solid angle that is less than about 90.%, less than about 75.%, less than about 60.%, or less than about 50.%, less than about 35.%, less than about 20.%, or even less, of a solid angle within which propagates away from the light-emitting device at least half of optical power of the device output light.

Example 8. The apparatus of any one of Examples 1 through 7 wherein the light-escape surface includes an array of nano-antennae that include one or more antenna materials, are shaped, sized and spaced relative to the nominal output vacuum wavelength $\lambda_0$, and arranged along the light-escape surface, so as to reradiate, upon irradiation by device output light, at least a portion of the device output light so as to result collectively in the incidence-angle-dependent transmission or the transmissive redirection.

Example 9. The apparatus of any one of Examples 1 through 8 wherein the light-escape surface includes a partial photonic bandgap structure arranged with one or more materials, morphology, and spacing relative the nominal output vacuum wavelength $\lambda_0$, so as to redirect, upon irradiation by device output light, at least a portion of the device output light so as to result in the incidence-angle-dependent transmission or the transmissive redirection.

Example 10. The apparatus of any one of Examples 1 through 9 wherein the light-escape surface includes a photonic crystal arranged with one or more materials, crystal morphology, and crystal-lattice spacing relative the nominal output vacuum wavelength $\lambda_0$, so as to redirect, upon irradiation by device output light, at least a portion of the device output light so as to result in the incidence-angle-dependent transmission or the transmissive redirection.

Example 11. The apparatus of any one of Examples 1 through 10 wherein the light-escape surface includes an array of meta-atoms or meta-molecules that include one or more meta-materials, are shaped, sized and spaced relative to the nominal output vacuum wavelength $\lambda_0$, and arranged along the light-escape surface, so as to reradiate, upon irradiation by device output light, at least a portion of the device output light so as to result collectively in the incidence-angle-dependent transmission or the transmissive redirection.

Example 12. The apparatus of any one of Examples 1 through 11 wherein the light-escape surface includes a multi-layer dielectric thin film that includes two or more materials characterized by corresponding refractive indices and having layer thicknesses, relative the nominal output vacuum wavelength $\lambda_0$, so as to redirect, upon irradiation by device output light, at least a portion of the device output light so as to result in the incidence-angle-dependent transmission or the transmissive redirection.

Example 13. The apparatus of Example 12 further comprising an optical resonator formed among layers of the multi-layer dielectric thin film, wherein the optical resonator is characterized by a resonance wavelength, relative the nominal output vacuum wavelength $\lambda_0$, that at least partly results in the incidence-angle-dependent transmission or the transmissive redirection.

Example 14. The apparatus of any one of Examples 1 through 13 wherein the light-escape surface includes one or more materials among: doped or undoped silicon; one or more doped or undoped III-V, II-VI, or Group IV semiconductors; doped or undoped silicon oxide, nitride, or oxynitride; one or more doped or undoped metal oxides, nitrides, or oxynitrides; one or more optical glasses; one or more doped or undoped polymers; or one or more metals or metal alloys.

Example 15. The apparatus of any one of Examples 1 through 14 wherein the inner surface of the optical collector includes a specular reflector or a diffuse scatterer.

Example 16. The apparatus of any one of Examples 1 through 15 wherein the inner surface of the optical collector includes a metal surface, a metallic coating, or a dielectric coating.

Example 17. The apparatus of any one of Examples 1 through 16 wherein the inner surface of the optical reflector includes one or more of (i) an array of nano-antennae, (ii) a partial photonic bandgap structure, (iii) a photonic crystal, or (iv) an array of meta-atoms or meta-molecules.

Example 18. The apparatus of any one of Examples 1 through 17 wherein at least a portion of the inner surface of the optical collector is shaped as (i) a frustum of a circular or elliptical cone, (ii) a frustum of a pyramid, or (iii) a portion of a sphere, spheroid, ellipsoid, paraboloid, hyperboloid, or ovoid.

Example 19. The apparatus of any one of Examples 1 through 18 wherein efficiency of reflection, scattering, or reradiation by the inner surface of the optical collector is greater than about 95.%, greater than about 97.%, or greater than about 98.%.

Example 20. The apparatus of any one of Examples 1 through 19 wherein the inner surface of the optical collector includes one or more materials among: doped or undoped silicon; one or more doped or undoped III-V, II-VI, or Group IV semiconductors; doped or undoped silicon oxide, nitride, or oxynitride; one or more doped or undoped metal oxides, nitrides, or oxynitrides; one or more optical glasses; one or more doped or undoped polymers; or one or more metals or metal alloys.

Example 21. The apparatus of any one of Examples 1 through 20 further comprising a substantially solid fill medium that at least partly fills an interior volume of the optical collector and is substantially transparent at the nominal output vacuum wavelength $\lambda_O$, wherein the light-escape surface is formed at an interface between the fill medium and an ambient medium.

Example 22. The apparatus of Example 21 wherein the fill medium includes one or more materials among: doped or undoped silicone, or one or more doped or undoped polymers.

Example 23. The apparatus of any one of Examples 1 through 22 further comprising a substantially solid substrate that separates an interior volume of the optical collector from an ambient medium and is substantially transparent at the nominal output vacuum wavelength $\lambda_O$, wherein the light-escape surface is formed on or within the substrate.

Example 24. The apparatus of Example 23 wherein the substrate includes one or more materials among: doped or undoped silicon; one or more doped or undoped III-V, II-VI, or Group IV semiconductors; doped or undoped silicon oxide, nitride, or oxynitride; one or more doped or undoped metal oxides, nitrides, or oxynitrides; one or more optical glasses; or one or more doped or undoped polymers.

Example 25. The apparatus of any one of Examples 23 or 24 wherein the interior volume is at least partly filled with a medium that is the same as the ambient medium.

Example 26. The apparatus of any one of Examples 23 through 25 further comprising a substantially solid fill medium that at least partly fills an interior volume of the optical collector and is substantially transparent at the nominal output vacuum wavelength $\lambda_O$, wherein the fill medium and the substrate are different materials.

Example 27. The apparatus of any one of Examples 23 through 25 further comprising a substantially solid fill medium that at least partly fills an interior volume of the optical collector and is substantially transparent at the nominal output vacuum wavelength $\lambda_O$, wherein the fill medium and the substrate are the same material.

Example 28. The apparatus of any one of Examples 23 through 27 further comprising an intervening layer of a lower-index medium between the substrate and at least a portion of the fill medium, the lower-index medium being substantially transparent at the nominal output vacuum wavelength $\lambda_O$, and is characterized by a refractive index lower than those of the substrate and the fill medium, wherein the intervening layer is positioned and arranged so as to redirect by total internal reflection at least a portion of the device output light propagating within the optical collector.

Example 29. The apparatus of any one of Examples 1 through 28 wherein the nominal output vacuum wavelength $\lambda_O$ is larger than about 0.20 µm, larger than about 0.4 µm, larger than about 0.8 µm, smaller than about 10. µm, smaller than about 2.5 µm, or smaller than about 1.0 µm.

Example 30. The apparatus of any one of Examples 1 through 29 wherein the light-emitting device comprises a light-emitting diode.

Example 31. The apparatus of any one of Examples 1 through 30 wherein the light-emitting device includes one or more doped or undoped III-V, II-VI, or Group IV semiconductor materials or alloys or mixtures thereof.

Example 32. A method for making the light-emitting device assembly of any one of Examples 1 through 31, the method comprising: (a) assembling the light-emitting device with the concave optical collector; and (b) forming the light-escape surface that extends across an open end of the optical collector and includes one or more of (i) the array of nano-antennae, (ii) the partial photonic bandgap structure, (iii) the photonic crystal, (iv) the array of meta-atoms or meta-molecules, or (v) the multi-layer dielectric thin film.

Example 33. A method for operating the light-emitting device assembly of any one of Examples 1 through 31, the method comprising supplying to the light-emitting device electrical power so that the light-emitting device assembly emits assembly output light from the light-escape surface.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Therefore, the present disclosure shall be construed as implicitly disclosing any embodiment having any suitable subset of one or more features—which features are shown, described, or claimed in the present application—including those subsets that may not be explicitly disclosed herein. A "suitable" subset of features includes only features that are neither incompatible nor mutually exclusive with respect to any other feature of that subset. Accordingly, the appended claims are hereby incorporated into the Detailed Description, with each claim standing on its own as a separate disclosed embodiment. In addition, each of the appended dependent claims shall be interpreted, only for purposes of disclosure by said incorporation of the claims into the Detailed Description, as if written in multiple dependent form and dependent upon all preceding claims with which it is not inconsistent. It should be further noted that the cumulative scope of the appended claims can, but does not necessarily, encompass the whole of the subject matter disclosed in the present application.

The following interpretations shall apply for purposes of the present disclosure and appended claims. The article "a" shall be interpreted as "one or more" unless "only one," "a single," or other similar limitation is stated explicitly or is implicit in the particular context; similarly, the article "the" shall be interpreted as "one or more of the" unless "only one of the," "a single one of the," or other similar limitation is stated explicitly or is implicit in the particular context. The conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. Similarly, "one or more of a dog or a cat" would be interpreted as including (i) one or more dogs without any cats, (ii) one or more cats without any dogs, or (iii) one or more dogs and one or more cats, unless explicitly stated otherwise or the alternatives are understood or disclosed (implicitly or explicitly) to be mutually exclusive or incompatible. Similarly, "one or more of a dog, a cat, or a mouse" would be interpreted as (i) one or more dogs without any cats or mice, (ii) one or more cats without and dogs or mice, (iii) one or more mice without any dogs or cats, (iv) one or more dogs and one or more cats without any mice, (v) one or more dogs and one or more mice without any cats, (vi) one or more cats and one or more mice without any dogs, or (vii) one or more dogs, one or more cats, and one or more mice. "Two or more of a dog, a cat, or a mouse" would be interpreted as (i) one or more dogs and one or more cats without any mice, (ii) one or more dogs and one or more mice without any cats, (iii) one or more cats and one or more mice without any dogs, or (iv) one or more dogs, one or more cats, and one or more mice; "three or more," "four or more," and so on would be analogously interpreted. For any of the preceding recitations, if any pairs or combinations of the included alternatives are understood or disclosed (implicitly or explicitly) to be incompatible or mutually exclusive, such pairs or combinations are understood to be excluded from the corresponding recitation. For purposes of the present disclosure and appended claims, unless explicitly stated otherwise, the words "comprising," "including," "having," and variants thereof, wherever they appear, shall be construed as open ended terminology, with the same meaning as if a phrase such as "at least" were appended after each instance thereof.

For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

For purposes of the present disclosure and appended claims, any labelling of elements, steps, limitations, or other portions of an embodiment, example, or claim (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment, example, or claim or, in some instances, it will be implicit or inherent based on the specific content of the embodiment, example, or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A light-emitting device assembly comprising:
 a concave optical collector having an inner surface that redirects within the optical collector light incident on the inner surface within the optical collector;
 a light-emitting device positioned and arranged so as to emit device output light to propagate within the optical collector, the device output light being characterized by a nominal output vacuum wavelength $\lambda_0$; and
 a light-escape surface that extends across an open end of the optical collector and includes one or more of (i) an array of nano-antennae, (ii) a partial photonic bandgap structure, (iii) a photonic crystal, (iv) an array of meta-atoms or meta-molecules, or (v) a multi-layer dielectric thin film,
 the light-escape surface being structurally arranged so as to exhibit, at the nominal output vacuum wavelength $\lambda_0$, both (i) incidence-angle-dependent transmission of light that decreases with increasing incidence angle and (ii) transmissive redirection of light to propagate at an angle less than a corresponding refracted angle, so that the light-escape surface exhibits transmission, as assembly output light, of first and second portions of the device output light propagating within the optical collector, the first portion without redirection within the optical collector by the light-escape surface and the second portion with redirection within the optical collector by the light-escape surface.

2. The apparatus of claim 1 wherein the incidence-angle-dependent transmission is characterized by a half-transmission angle $\Theta_{TH}$ that is less than about 60. degrees.

3. The apparatus of claim 1 wherein the incidence-angle-dependent transmission and the transmissive redirection of the light-escape surface, and arrangement of the light-emitting device, the optical collector, and the light-escape surface, result in propagation away from the light-escape surface of at least half of optical power of the assembly output light within a solid angle less than about 1.5 sr, or more than about 55.%. of optical power of the assembly output light within a solid angle less than about 1.8 sr.

4. The apparatus of claim 1 wherein the light-escape surface includes an array of nano-antennae that include one or more antenna materials, are shaped, sized, and spaced relative to the nominal output vacuum wavelength $\lambda_0$, and arranged along the light-escape surface, so as to reradiate, upon irradiation by device output light, at least a portion of the device output light so as to result collectively in one or both of the incidence-angle-dependent transmission or the transmissive redirection.

5. The apparatus of claim 1 wherein the light-escape surface includes a partial photonic bandgap structure arranged with one or more materials, morphology, and spacing relative to the nominal output vacuum wavelength $\lambda_0$, so as to redirect, upon irradiation by device output light, at least a portion of the device output light so as to result in one or both of the incidence-angle-dependent transmission or the transmissive redirection.

6. The apparatus of claim 1 wherein the light-escape surface includes a photonic crystal arranged with one or more materials, crystal morphology, and crystal-lattice spacing relative to the nominal output vacuum wavelength $\lambda_0$, so as to redirect, upon irradiation by device output light, at least a portion of the device output light so as to result in one or both of the incidence-angle-dependent transmission or the transmissive redirection.

7. The apparatus of claim 1 wherein the light-escape surface includes an array of meta-atoms or meta-molecules that include one or more meta-materials, are shaped, sized and spaced relative to the nominal output vacuum wavelength $\lambda_0$, and arranged along the light-escape surface, so as to reradiate, upon irradiation by device output light, at least a portion of the device output light so as to result collectively in one or both of the incidence-angle-dependent transmission or the transmissive redirection.

8. The apparatus of claim 1 wherein the light-escape surface includes a multi-layer dielectric thin film that includes two or more materials characterized by corresponding refractive indices and having layer thicknesses, relative to the nominal output vacuum wavelength $\lambda_0$, so as to redirect, upon irradiation by device output light, at least a portion of the device output light so as to result in the incidence-angle-dependent transmission or the transmissive redirection.

9. The apparatus of claim 8 further comprising an optical resonator formed among layers of the multi-layer dielectric thin film, wherein the optical resonator is characterized by a resonance wavelength, relative to the nominal output vacuum wavelength $\lambda_0$, that at least partly results in the incidence-angle-dependent transmission or the transmissive redirection.

10. The apparatus of claim 1 wherein the inner surface of the optical collector includes a specular reflector, a diffuse scatterer, a metal surface, a metallic coating, or a dielectric coating.

11. The apparatus of claim 1 wherein the inner surface of the optical reflector includes one or more of (i) an array of nano-antennae, (ii) a partial photonic bandgap structure, (iii) a photonic crystal, or (iv) an array of meta-atoms or meta-molecules.

12. The apparatus of claim 1 wherein efficiency of reflection, scattering, or reradiation by the inner surface of the optical collector is greater than about 95.%.

13. The apparatus of claim 1 further comprising a substantially solid fill medium that at least partly fills an interior volume of the optical collector and is substantially transparent at the nominal output vacuum wavelength $\lambda_0$, wherein the light-escape surface is formed at an interface between the fill medium and an ambient medium.

14. The apparatus of claim 1 further comprising a substantially solid substrate that separates an interior volume of the optical collector from an ambient medium and is substantially transparent at the nominal output vacuum wavelength $\lambda_0$, wherein the light-escape surface is formed on or within the substrate.

15. The apparatus of claim 14 wherein the interior volume is at least partly filled with a medium that is the same as the ambient medium.

16. The apparatus of claim 14 further comprising a substantially solid fill medium that at least partly fills an interior volume of the optical collector and is substantially transparent at the nominal output vacuum wavelength $\lambda_0$.

17. The apparatus of claim 16 further comprising an intervening layer of a lower-index medium between the substrate and at least a portion of the fill medium, the lower-index medium being substantially transparent at the nominal output vacuum wavelength $\lambda_0$, and is characterized by a refractive index lower than those of the substrate and the fill medium, wherein the intervening layer is positioned and arranged so as to redirect by total internal reflection at least a portion of the device output light propagating within the optical collector.

18. The apparatus of claim 1 wherein the light-emitting device comprises a light-emitting diode.

19. A method for making a light-emitting device assembly, the method comprising:
assembling a light-emitting device with a concave optical collector, the optical collector having an inner surface that redirects within the optical collector light incident on the inner surface within the optical collector, the light-emitting device being positioned and arranged so as to emit device output light to propagate within the optical collector, the device output light being characterized by a nominal output vacuum wavelength $\lambda_0$; and
forming a light-escape surface that extends across an open end of the optical collector and includes one or more of (i) an array of nano-antennae, (ii) a partial photonic bandgap structure, (iii) a photonic crystal, (iv) an array of meta-atoms or meta-molecules, or (v) a multi-layer dielectric thin film,
the light-escape surface being structurally arranged so as to exhibit, at the nominal output vacuum wavelength $\lambda_0$, both (i) incidence-angle-dependent transmission of light that decreases with increasing incidence angle and (ii) transmissive redirection of light to propagate at an angle less than a corresponding refracted angle, so that the light-escape surface exhibits transmission, as assembly output light, of first and second portions of the device output light propagating within the optical collector, the first portion without redirection within the optical collector by the light-escape surface and the second portion with redirection within the optical collector by the light-escape surface.

20. A method for operating a light-emitting device assembly, the method comprising supplying to a light-emitting device electrical power so that the light-emitting device assembly emits assembly output light from a light-escape surface, the light-emitting device being assembled with a concave optical collector, the optical collector having an inner surface that redirects within the optical collector light incident on the inner surface within the optical collector, the light-emitting device being positioned and arranged so as to emit device output light to propagate within the optical collector, the device output light being characterized by a nominal output vacuum wavelength $\lambda_0$, the light-escape surface extending across an open end of the optical collector and including one or more of (i) an array of nano-antennae, (ii) a partial photonic bandgap structure, (iii) a photonic crystal, (iv) an array of meta-atoms or meta-molecules, or (v) a multi-layer dielectric thin film, the light-escape surface being structurally arranged so as to exhibit, at the nominal output vacuum wavelength $\lambda_0$, both (i) incidence-angle-dependent transmission of light that decreases with increasing incidence angle and (ii) transmissive redirection of light to propagate at an angle less than a corresponding refracted angle, so that the light-escape surface exhibits transmission, as assembly output light, of first and second portions of the device output light propagating within the optical collector, the first portion without redirection within the optical collector by the light-escape surface and the second portion with redirection within the optical collector by the light-escape surface.

* * * * *